United States Patent
Tsunasaki et al.

(10) Patent No.: US 9,939,546 B2
(45) Date of Patent: Apr. 10, 2018

(54) DETECTION METHOD AND DETECTION DEVICE OF BURIED METAL

(71) Applicant: Fuji Tecom Inc., Tokyo (JP)

(72) Inventors: Masaru Tsunasaki, Osaka (JP); Kenshi Kubota, Tokyo (JP)

(73) Assignee: FUJI TECOM INC., Tokyo (JP)

( * ) Notice: Subject to any disclaimer, the term of this patent is extended or adjusted under 35 U.S.C. 154(b) by 0 days.

(21) Appl. No.: 15/126,454

(22) PCT Filed: Mar. 13, 2015

(86) PCT No.: PCT/JP2015/057424
§ 371 (c)(1),
(2) Date: Sep. 15, 2016

(87) PCT Pub. No.: WO2015/141568
PCT Pub. Date: Sep. 24, 2015

(65) Prior Publication Data
US 2017/0082769 A1 Mar. 23, 2017

(30) Foreign Application Priority Data
Mar. 17, 2014 (JP) .................. 2014-053904

(51) Int. Cl.
G01V 3/10 (2006.01)
G01V 3/06 (2006.01)
G01V 3/15 (2006.01)

(52) U.S. Cl.
CPC .................. *G01V 3/10* (2013.01); *G01V 3/06* (2013.01); *G01V 3/15* (2013.01)

(58) Field of Classification Search
CPC .............. G01V 3/10; G01V 3/15; G01V 3/06
See application file for complete search history.

(56) References Cited

U.S. PATENT DOCUMENTS

| 4,710,708 A | * | 12/1987 | Rorden | ............ E21B 47/02224 |
| | | | | 324/207.26 |
| 5,506,506 A | * | 4/1996 | Candy | .................... G01V 3/105 |
| | | | | 324/232 |
| 2006/0244454 A1 | * | 11/2006 | Gard | ....................... E21B 44/00 |
| | | | | 324/326 |

FOREIGN PATENT DOCUMENTS

JP    S 63313087    12/1988
JP    2001356177    12/2001
(Continued)

*Primary Examiner* — Minh Phan
*Assistant Examiner* — Zannatul Ferdous
(74) *Attorney, Agent, or Firm* — Muncy, Geissler, Olds & Lowe P.C.

(57) ABSTRACT

A detection method and detection device of buried metal which are capable of detecting singular points, in horizontal and vertical directions, of metal tubes, telecommunication cables, and electric power cables, or the like buried in the ground. A magnetic field component of the direction of 3 axes of a XYZ axis is detected by two or more magnetic sensors installed in the detectable direction, and detects a magnetic field induced to buried metal. While carrying out synchronous detection of these magnetic field components and calculating for each amplitude and each phase of a magnetic field component of the direction of 3 axes, image processing is carried out and it is outputted to a display. While calculating for the position of a singular point, a singular point distinguishes whether it is an over-crossing state, it is an under-crossing state, or it is a branched state from these image data.

4 Claims, 15 Drawing Sheets

(56) References Cited

FOREIGN PATENT DOCUMENTS

| JP | 2006284386 | 10/2006 |
|---|---|---|
| JP | 2007255986 | 10/2007 |

\* cited by examiner

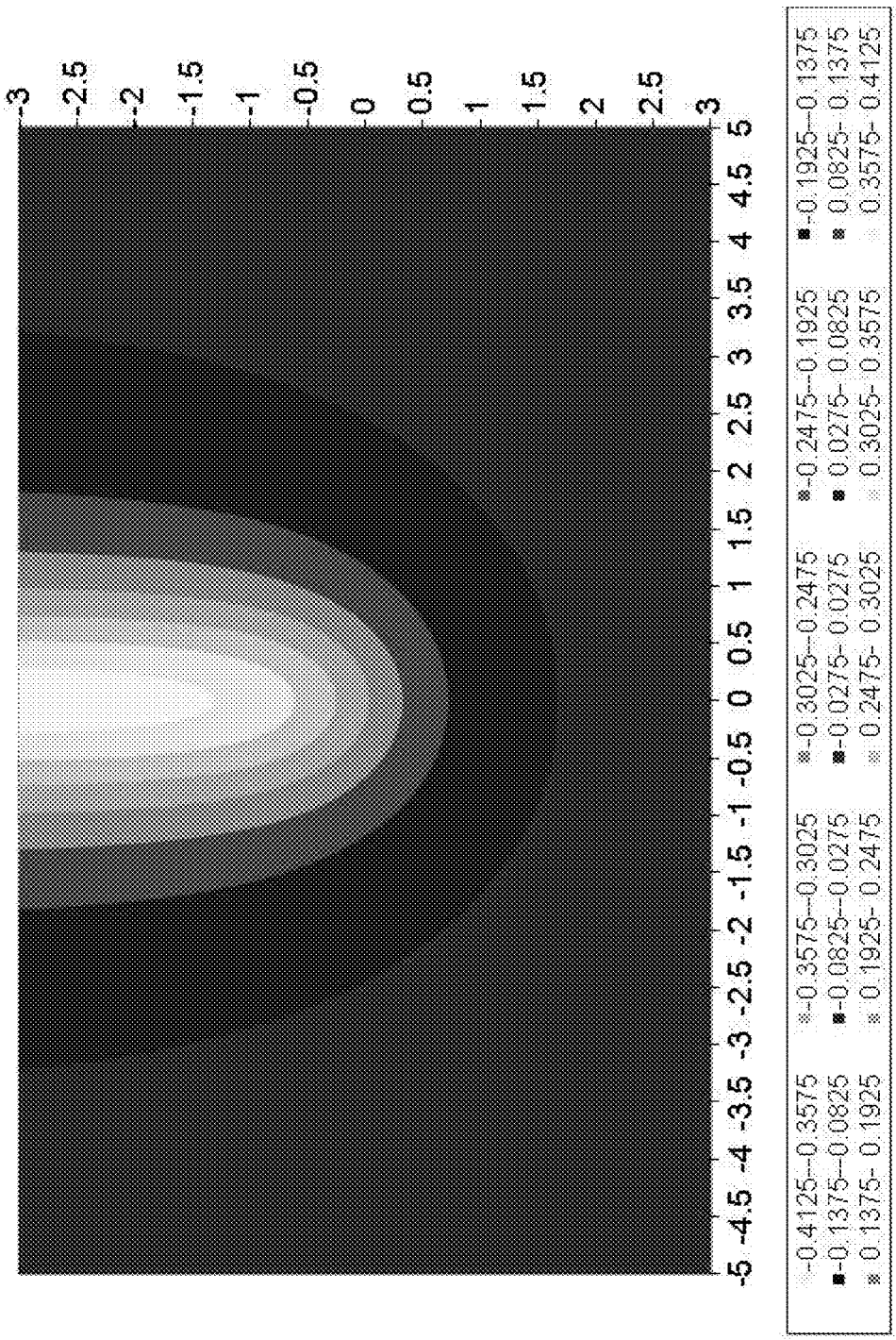

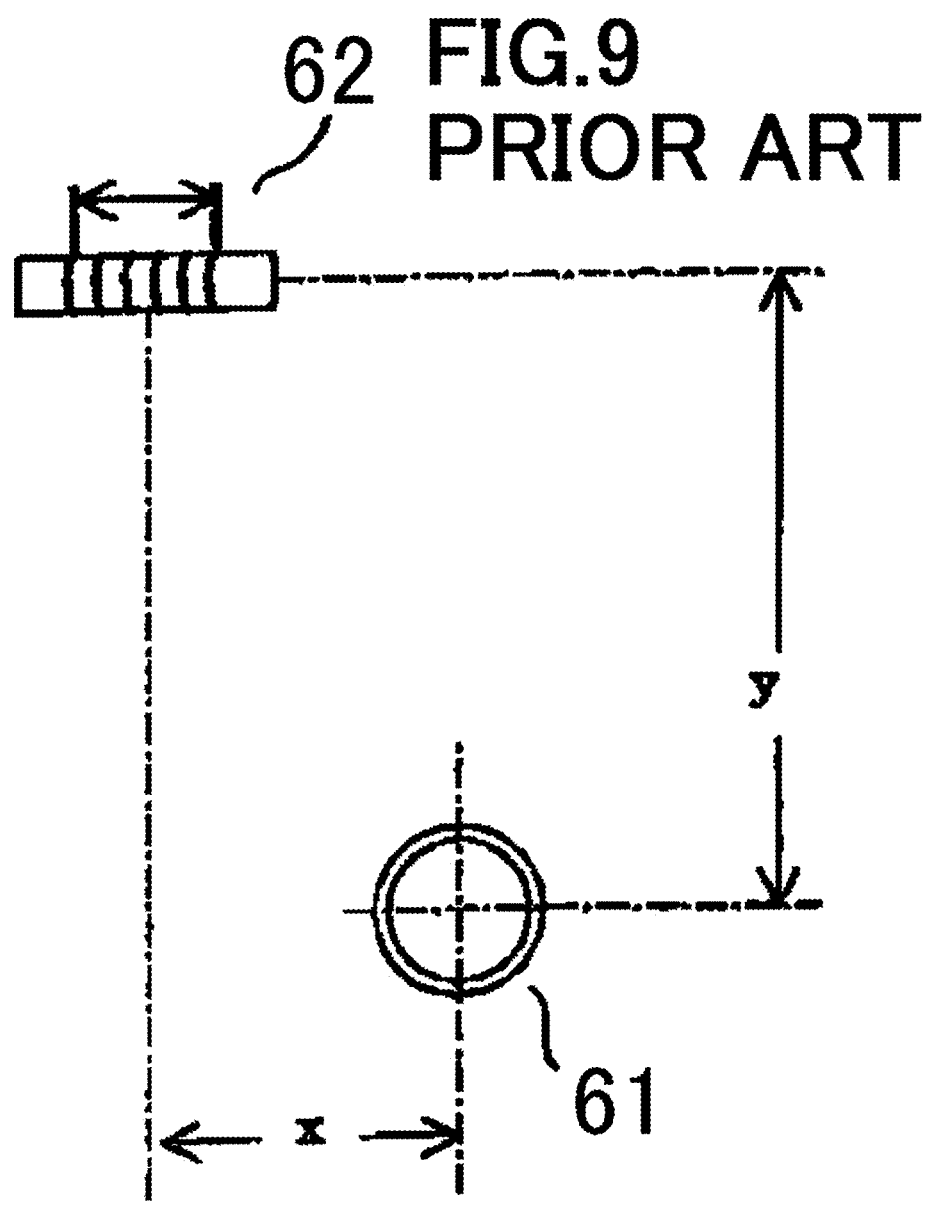

DETECTION METHOD AND DETECTION DEVICE OF BURIED METAL

FIELD OF THE INVENTION

This invention relates to the detection method and detection device of buried metal for detecting the metal which has a certain amount of length and conductivity of the metal tube or the cable, etc. currently buried in the ground and into the concrete of building.

Especially this invention relates to the detection method and detection device of buried metal which can detect the metal having a singular point which is crooked horizontally and vertically or is branched like the metal tube or a telecommunication cable currently buried in the ground.

BACKGROUND OF THE INVENTION

Usually, in the ground, many metal pipes, such as a water pipe, a gas pipe, and a drain pipe, or cables, such as a telecommunication cable and an electric power cable, are buried (hereafter, except for the conventional example portion, these are named generically and it is only described as buried metal).

A buried metal is not simply buried under the horizontal direction or the perpendicular direction linearly.

A buried metal is crooked horizontally or vertically, or branches, is in the state which crossed intricately mutually and carried out congestion, and is buried.

Thus, since much buried metal is in the ground, for the accident prevention by construction of other companies and for the efficient control of maintenance of the buried metal of one's company, by un-excavating, the technology for detecting the position (a horizontal position and the burial depth) of in the ground buried metal is proposed.

As typical prior art for detecting the position of a buried metal, there are a radar which searches underground, and an electromagnetic guidance pipeline detector called a pipe locator.

The detection principle of a radar which searches in the ground detects in the ground metal pipe by emitting an electric wave in the ground, receiving the reflective wave from the metal pipe currently buried in the ground, and performing signal processing and conversion to signals.

Since an electric wave is reflected from the face where physical properties change, in the ground structures, such as a metal pipe, a nonmetallic pipe, and a cave, can also be detected by this method.

On the other hand, as shown in FIG. 6 (a)-(c), the detection principle of the electromagnetic guidance pipeline detector (brand name: pipe locator) of nonpatent document 1 is as follows.

If an alternating current is sent through metal pipe 51 which is buried in the ground 50, a concentric circle-like magnetic field (it is considered as magnetic field H) will occur centering on this metal pipe 51 (refer to FIG. 6 (b)).

Magnetic sensor 52a of the receiver which is on the ground detects this magnetic field H, that magnetic field H is calculated, and induction voltage is calculated further.

The position of metal pipe 51 can be detected from the position where this induction voltage serves as the maximum (FIG. 6 (c)).

The burial depth of metal pipe 51 is calculated from this induction voltage.

Therefore, the object detected is limited to the metal pipe which has conductivity.

Thus, the pipe locator is constituted by the receiver provided with the transmitter for sending current through a metal pipe, and the magnetic sensor which detects magnetic field H generated when current flowed.

Furthermore, the method of sending current through a metal pipe from a transmitter has two kinds, direct method and a induction method.

As shown in FIG. 7, in direct method, the transmitter 53 is connected to the portion of metal pipe 51 exposed on the ground, or transmitter 53 is connected to the metal pipe 51 currently laid in the ground 50 via lead 54, and current is sent.

In addition, the leak current which flows into the earth 50 from the metal pipe 51 is constituted so that it may feedback to a transmitter 53 through a earth 55.

On the other hand, as shown in FIG. 8, in induction method, emitting an electric wave towards in the ground 50 from transmitter 53a which installed on the ground, generating a magnetic field and the current by electromagnetic induction is sent through metal pipe 51 of in the ground 50 by non-contact.

The magnetic field by the generated induced current receives with receiver 53 provided with magnetic sensor 53a which is on the ground, and is detecting a position, burial depth, etc. of the metal pipe currently buried from the amplitude of the magnetic field component.

In direct method as shown in FIG. 7, since current can be sent only through the metal pipe for detection, the value of magnetic field H to generate also becomes large, and detection accuracy is good compared with an induction method.

However, in direct method, since a transmitter must be directly connected to a metal pipe, it is hard to apply to the metal pipe which does not have an exposed portion on the ground.

On the other hand, as shown in FIG. 9, an alternating current is sent through line buried metal body 61 as a method of investigating the burial position and depth of line buried metal body 61, detection coil 62 detects change of magnetic field H which this generated, at least two burial detection measuring methods were adopted, and it applied for the invention which amended detection measured value based on the measurement result by these previously (patent documents 1).

Hereafter, this is explained.

As shown in FIG. 9, line buried metal body 61 sufficiently long in the shape of a straight line is laid under the position of perpendicular distance y from detection coil 62, and it is assumed to this line buried metal body 61 that the current of I sin ($\omega$t) is flowing.

Then, when detection coil 62 parallel to surface of the earth has been arranged near right above this line buried metal body 61, generally electromotive force Eh induced by detection coil 62 is expressed with a following formula (1).

$$Eh = k\{(y)/(x2+y2)\}I\omega \sin(\omega t) \qquad (1)$$

Here, x is the horizontal distance from right above line buried metal body 61 to detection coil 62, and k is a fixed number which becomes settled with detection coil 62.

From the above-mentioned formula (1), electromotive force Eh becomes the maximum in a right above line buried metal body 61 position, and the value is proportional to the current which flows through line buried metal body 61, and is in inverse proportion to perpendicular depth y.

Then, as a method of measuring burial depth y of line buried metal body 61, when detection coil 62 is horizontally moved from a right above line buried metal body 61 position (x=0), electromotive force E0 induced by detection coil 62 is expressed with a following formula (2) that what is necessary is just to substitute x=0 for the above-mentioned formula (1).

$$E0=k\{(1/y)\}I\omega \sin(\omega t) \quad (2)$$

Subsequently, after moving only distance x horizontally (x direction) from the right above position (x=0) of the line buried metal body 61, electromotive force Ey induced by detection coil 62 is set to one half of electromotive force E0 expressed with the above-mentioned formula (2) is calculated.

As a result, horizontal displacement distance x from the right above position (x=0) of the line buried metal body 61 becomes equal to burial depth y.

Therefore, it can calculate for burial depth y of line buried metal body 61 by measuring horizontal displacement distance x to which detection coil 62 was moved.

As other methods of measuring burial depth y of line buried metal body 61,

After moving detection coil 62, detecting a depth measurement signal separately and removing the peak value and the minimum value within predetermined time, the detection value of others which remain is averaged and it is considered as the depth measured value which calculates this averaged value.

PRIOR ART DOCUMENTS

Patent Documents

[Patent documents 1]
JP,2006-284386,A

Non Patent Document

[Nonpatent document 1]
Domestic magazine "Piping, a device and plant art", Vol. 31, No. 6, page. 4-6, title "present condition of burial inquiry art" Nagashima Shingo work

DESCRIPTION OF THE INVENTION

Problem(s) to be Solved by the Invention

In the detection method of the buried metal currently indicated by nonpatent document 1, the length of the buried metal tube is premised on being unlimited length and being a straight line-form.

Therefore, when the buried metal pipe is limited length and a curved part and a branch part exist, when the buried metal pipe and other buried metal pipes, etc. cross or carry out congestion in the ground, under the influence of other buried metal pipes, a secondary induced magnetic field and the 3rd induced magnetic field occur. These induced magnetic fields caused an error of measurement, and there was a problem that the position of the buried metal pipe which is made into the purpose could not be measured correctly.

The line buried metal body detection method of the indication to patent documents 1 for which the inventor etc. applied, and the method of the indication to the above-mentioned nonpatent literature 1 are the same.

It is premised on line buried metal body 61 being infinite length, and being a straight line-like in these methods.

Then, when line buried metal body 61 leading to an error of measurement is limited length and a curved part and a branch part exist, when line buried metal body 61 crosses or carries out congestion in the ground, although the cause of the error of measurement was reduced by adopting two burial depth measuring methods and controlling the induced magnetic field generated under the influence of other buried metal bodies, this method was not necessarily enough for control of an error of measurement.

Moreover, when the curved part and branch part which are singular points exist in line buried metal body 61, in these singular points, since the main axis of line buried metal body 61 changes, direction of magnetic field H also changes to it.

Since the position of line buried metal body 61 is judged with the amplitude of the magnetic field component by which magnetic field H was compounded, that distinction which the state of line buried metal object 61 is in the state (an over-crossing state) which looked up in the direction of surface of the ground (y direction), it is in the state (an under-crossing state) which declined to the y direction, or it is a branched state, cannot be performed.

Thus, there was a problem that distinction of the singular point (an over-crossing state, an under-crossing state, a branched state) of what kind of state could not be performed.

If line buried metal bodies 61 were a telecommunication cable, an electric power cable, etc., the magnetic field by various kinds of current which is flowing into these cables occurred, and this caused an error of measurement.

This invention relates to the detection method and its detection device of a buried metal aiming at solving the above-mentioned problem.

According to this invention, the position and singular point (the crookedness part and the branch part) of buried metal which are in the ground can be detected.

It can be distinguished whether these singular points are in the state (over-crossing state) which looked up vertical direction, or in the state (under-crossing state) which look down vertically, or it is a branched state.

Means for Solving the Problem

A detection method of the buried metal which detects buried metal by sending an alternating current through buried metal from a transmitter, and detecting the magnetic field generated by the alternating current which flows into this buried metal with the magnetic sensor of a receiver, including:
the receiver consists of two or more magnetic sensors installed in the direction to detectable the magnetic field component of the direction of XYZ axes, respectively,
a detector which detects the magnetic field component of the direction of the XYZ axes detected with the magnetic sensor, respectively,
a CPU which has the function to perform signal processing each amplitude and each phase of the magnetic field component of the direction of 3 axes,
a display which displays the result which carried out signal processing by this CPU, the detector calculates for each phase of the magnetic field component of the direction of the XYZ axes, from the magnetic field by synchronous detection using the transmitted signal of the transmitter for sending an alternating current through the buried metal as a reference signal,
the CPU creates image data which expresses magnetic field distribution of an XYZ axis component, about a magnetic field component of an XYZ axis, respectively by carrying out image processing of each amplitude and each phase of a magnetic field component of the direction of 3 axes,
the image data is outputted to the display, while calculating for the position of the singular point from each amplitude of the image data, and this singular point is determined whether it is an over-crossing state or it is an under-crossing state from the phase of the image data of an X-axis component and the phase of the image data of a Y-axis component in this singular point, and it is determined from at least one image data of the XYZ axis component in the singular point whether it is an branched state.

The receiver is installed apart from the magnetic sensor installed in the direction which can detect the magnetic field component of the direction of the X-axis, and it has the 2nd magnetic sensor installed in the direction which can detect the magnetic field component of the direction of the X-axis, the detector detects the 2nd magnetic field component of the direction of the X-axis detected with the 2nd magnetic sensor,
the CPU calculates for the amplitude and the phase of the 2nd magnetic field component of the direction of the X-axis, respectively,
and it calculates for the depth of the singular point from the amplitude and the phase of the 2nd magnetic field component of the direction of the X-axis, and the amplitude and the phase of the (1st) magnetic field component of the direction of the X-axis,
the display shows the depth of the singular point.

A detection device of the buried metal which detects the buried metal by sending an alternating current through the buried metal from a transmitter, and detecting the magnetic field generated by the alternating current which flows into this buried metal with the magnetic sensor of the receiver, the invention comprising;
the receiver consists of two or more magnetic sensors installed in the direction to detectable the magnetic field component of the direction of XYZ axes, respectively,
the detector which detects the magnetic field component of the direction of the XYZ axes detected with the magnetic sensor, respectively,
the CPU which has the function to perform signal processing of each amplitude and each phase of a magnetic field component of the direction of the XYZ axes,
the display which displays the result which carried out signal processing by this CPU,
the detector has the function to calculate for each phase of the magnetic field component of the direction of the XYZ axis, from the magnetic field, respectively, by synchronous detection using the transmitting signal of the transmitter for sending an alternating current through the buried metal as a reference signal, and
the CPU has the function which creates image data which expresses magnetic field distribution of an XYZ axis component, about a magnetic field component of an XYZ axis, respectively by carrying out image processing of each amplitude and each phase of a magnetic field component of the direction of the XYZ axes,
the function which outputs the image data to the display,
the function which calculating for the position of the singular point from each amplitude of the image data, and
the function which this singular point is determined whether it is an over-crossing state or it is an under-crossing state from the phase of the image data of an X-axis component and the phase of the image data of a Y-axis component in this singular point, and the function which it is determined from at least one image data of the XYZ axis component in the singular point whether it is an branched state.

The receiver is installed apart (constant distance) from the magnetic sensor installed in the direction which can detect the magnetic field component of the direction of the X-axis, and it has the 2nd magnetic sensor installed in the direction which can detect the magnetic field component of the direction of the X-axis,
the detector has the function to detect the 2nd magnetic field component of the direction of the X-axis detected with the 2nd magnetic sensor,
the CPU has the function to calculate for the amplitude and the phase of the 2nd magnetic field component of the direction of the X-axis, respectively,
and the function to calculate for the depth of the singular point from the amplitude and the phase of the 2nd magnetic field component of the direction of the X-axis, and the amplitude and the phase of the (1st) magnetic field component of the direction of the X-axis,
the display has a function which displays the depth of the singular point.

Effect of the Invention

Since the invention of the present disclosure was constituted as mentioned above, while being able to pinpoint the position of the singular point, it can be distinguished whether this singular point is an over-crossing state, it is an under-crossing state, or it is a branched state.

Since it can indicate whether a singular point is an over-crossing state, it is an under-crossing state, or it is a branched state clearly, specification and distinction of the position of a singular point become still easier.

Moreover, in the invention according to the present disclosure, the depth of the singular point can be measured.

BRIEF DESCRIPTION OF THE DRAWINGS

FIG. 2A shows distribution of the magnetic field component of the direction of the X-axis, FIG. 2B shows distribution of the magnetic field component of the direction of the Y-axis, and FIG. 2C shows distribution of the magnetic field component of the direction of the Z-axis.

FIG. 3A shows distribution of the magnetic field component of the direction of the X-axis, FIG. 3B shows distribution of the magnetic field component of the direction of the Y-axis, and FIG. 3C shows distribution of the magnetic field component of the direction of the Z-axis.

FIGS. 4A-4C show the embodiment of this invention and the magnetic field distribution in the case of measuring the portion where a buried pipe is a branched state by using detection device 1 of the buried metal by this invention, FIG. 4A shows distribution of the magnetic field component of the direction of the X-axis, FIG. 4B shows distribution of the magnetic field component of the direction of the Y-axis, and FIG. 4C shows distribution of the magnetic field component of the direction of the Z-axis.

FIG. 5A is an over-crossing state, in the case of Y=0.58, FIG. 5B is an under-crossing state, in the case of Y=0.8, FIG. 5C is a branched state.

FIG. 9 shows a conventional example and is a mimetic diagram of the buried metal object exploration equipment which the inventor has filed previously.

THE FORM FOR INVENTING

In the detection method of the buried metal which detects buried metal by sending an alternating current through buried metal from a transmitter, and detecting the magnetic field generated by the alternating current which flows into this buried metal with the magnetic sensor of a receiver,
the receiver consist of two or more magnetic sensors installed in the direction to detectable of the magnetic field component of the direction of 3 axes, namely the XYZ axes, respectively,
a detector which detects the magnetic field component of the direction of 3 axes detected with the magnetic sensor, respectively,
a CPU which has the function to perform signal processing each amplitude and each phase of the magnetic field component of the direction of 3 axes,
a display which displays the result which carried out signal processing by this CPU, the detector calculates for each phase of the magnetic field components of the directions of 3 axes, namely the XYZ axes, from a magnetic field, respectively, by synchronous detection using the transmitting signal from the transmitter for sending an alternating current through buried metal as a reference signal,
the CPU creates image data about the magnetic field component of a XYZ axis, respectively by carrying out image processing of each amplitude and each phase of a magnetic field component of the direction of 3 axes,
these image data is outputted to the display and while calculating for a position of a singular point from these image data,
This singular point is determined whether it is an over-crossing state, it is an under-crossing state, or it is a branched state.

Embodiment 1

The embodiment of this invention is explained in detail based on FIGS. 1, 2A-2C, 3A-3C, and 4A-4C.

Figure 1:
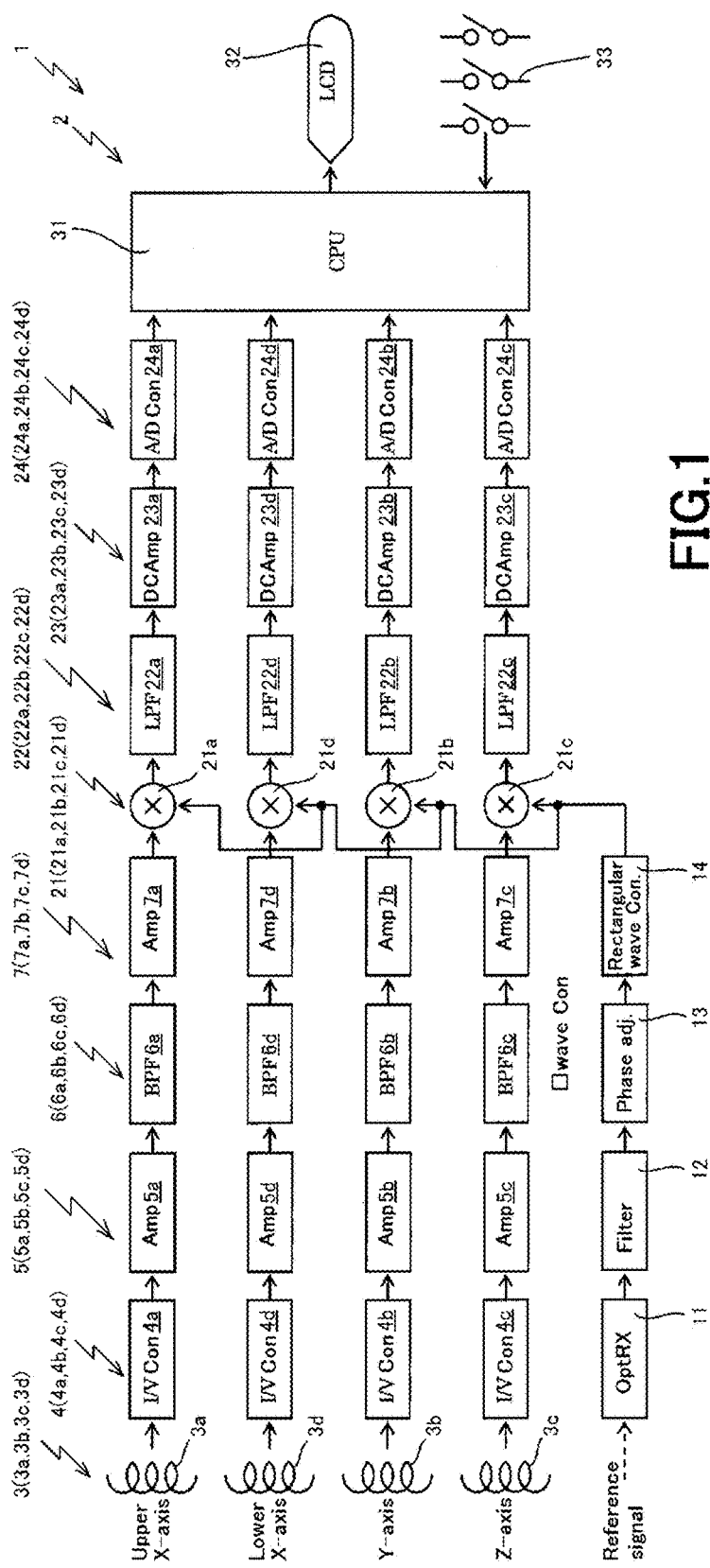
FIG. 1 shows the embodiment of this invention and is the block diagram of receiver 2 of detection device 1 of the buried metal by this invention.

FIGS. 1, 2A-2C, 3A-3C, and 4A-4C show the embodiment of this invention, and FIG. 1 is a block diagram of receiver 2 of detection device 1 of the buried metal by this invention.

Figure 2A:
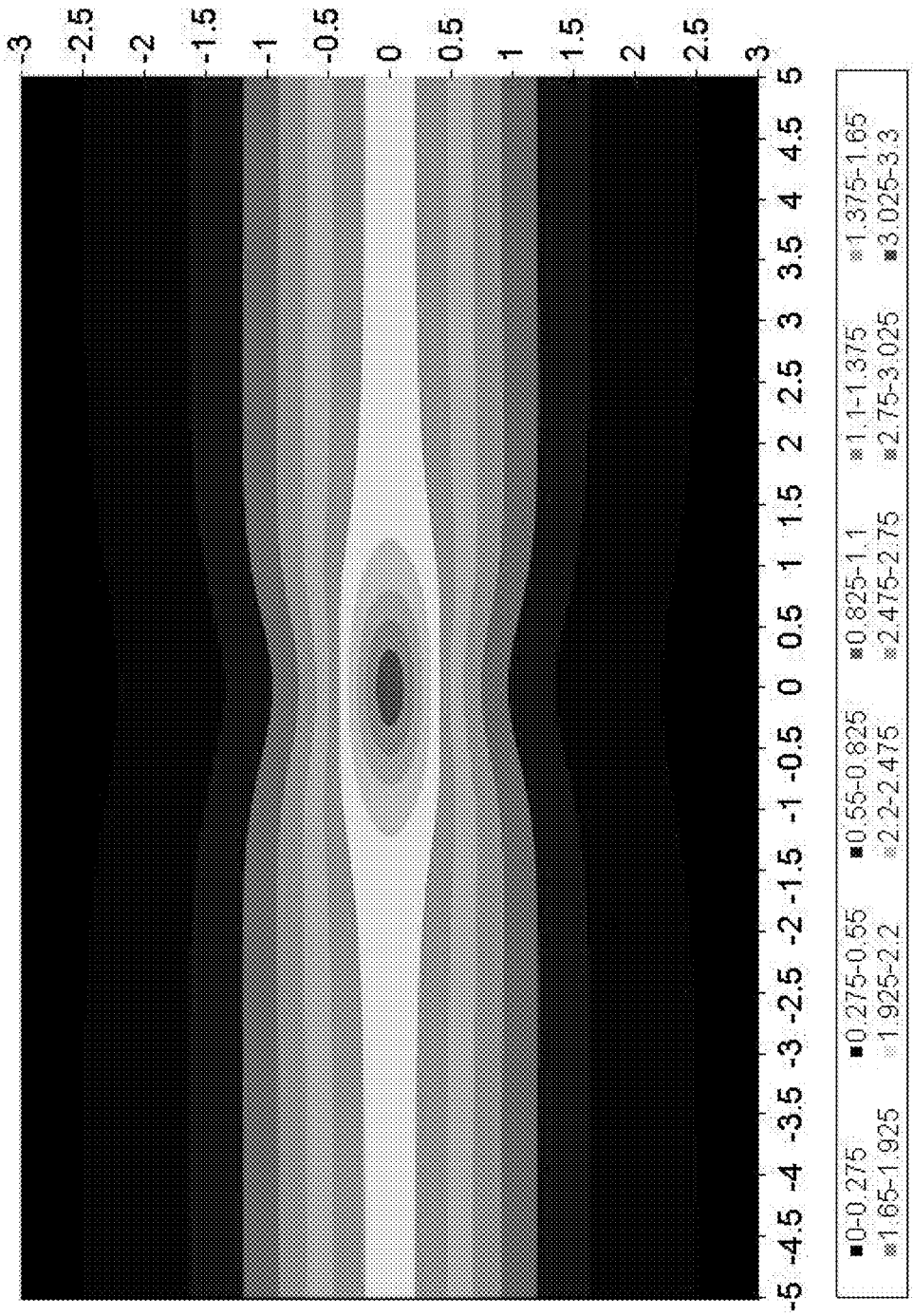
FIGS. 2A-2C show the embodiment of this invention and the magnetic field distribution in the case of measuring the portion where a buried pipe is an over-crossing state by using detection device 1 of the buried metal by this invention.
Figure 2B:
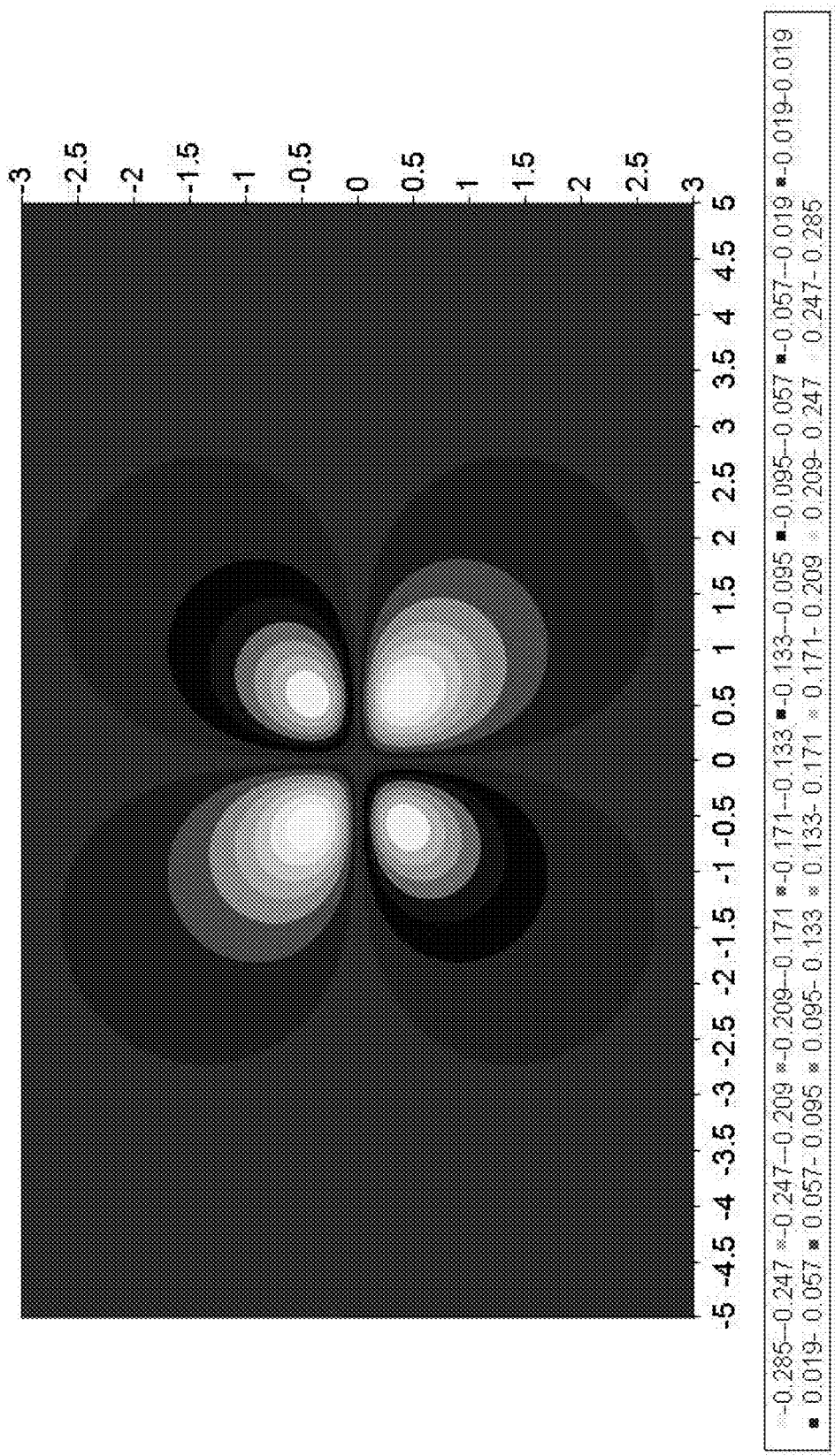
Figure 2C:
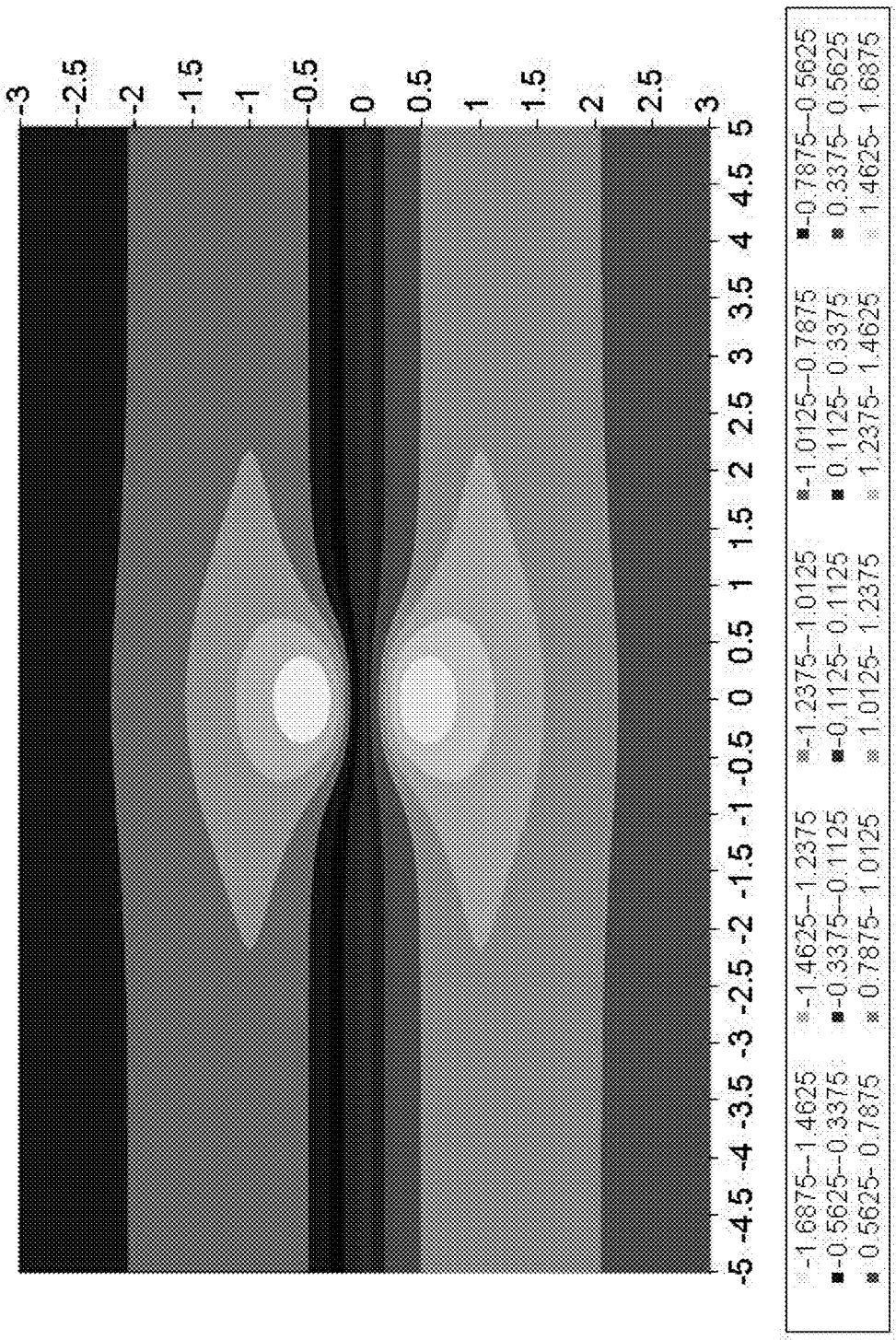

FIGS. 2A-2C show the magnetic field distribution in the case of measuring the portion where a buried pipe is an over-crossing state by using detection device 1 of the buried metal.

Figure 3A:
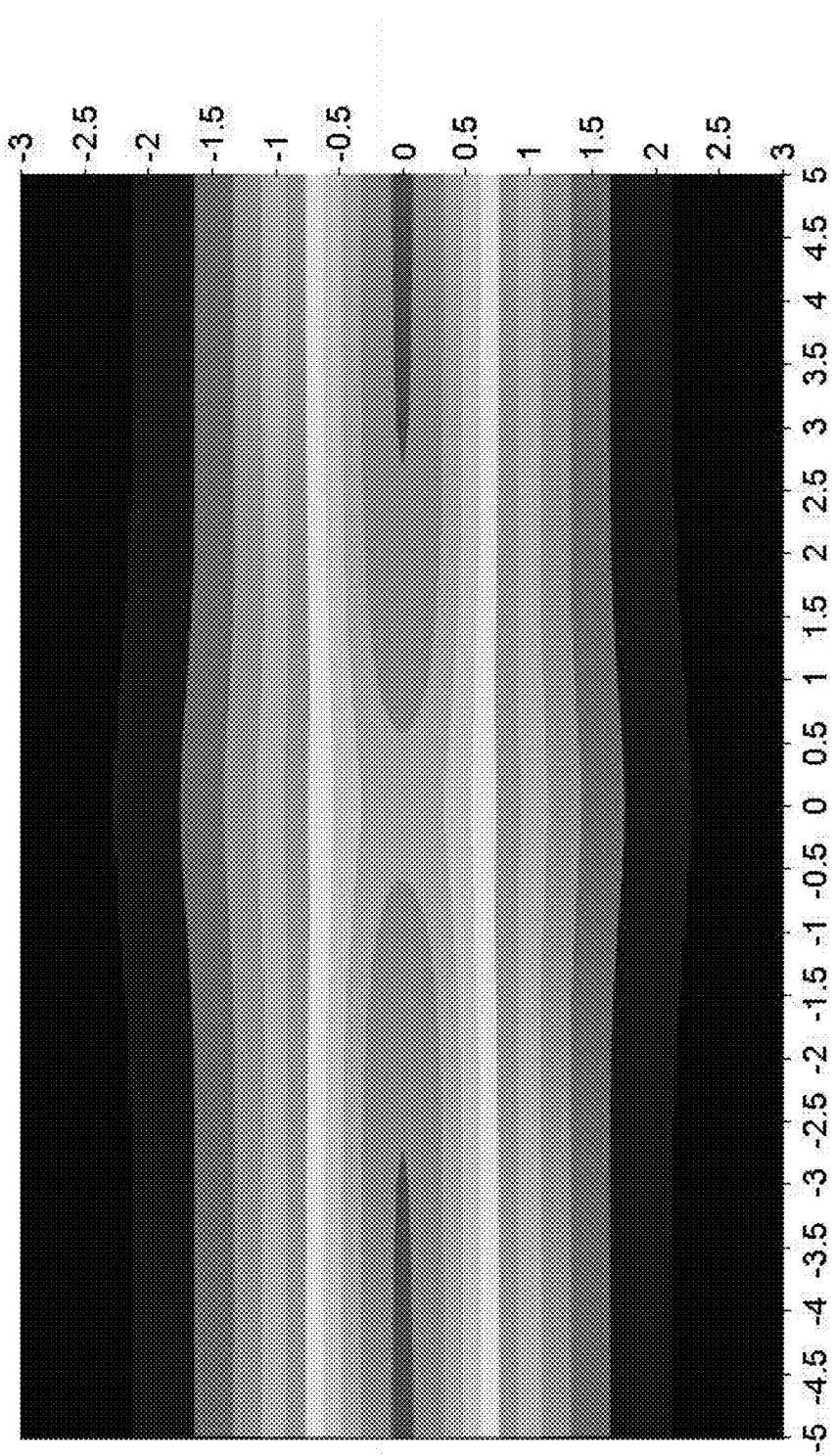
FIGS. 3A-3C show the embodiment of this invention and the magnetic field distribution in the case of measuring the portion where a buried pipe is an under-crossing state by using detection device 1 of the buried metal by this invention.
Figure 3B:
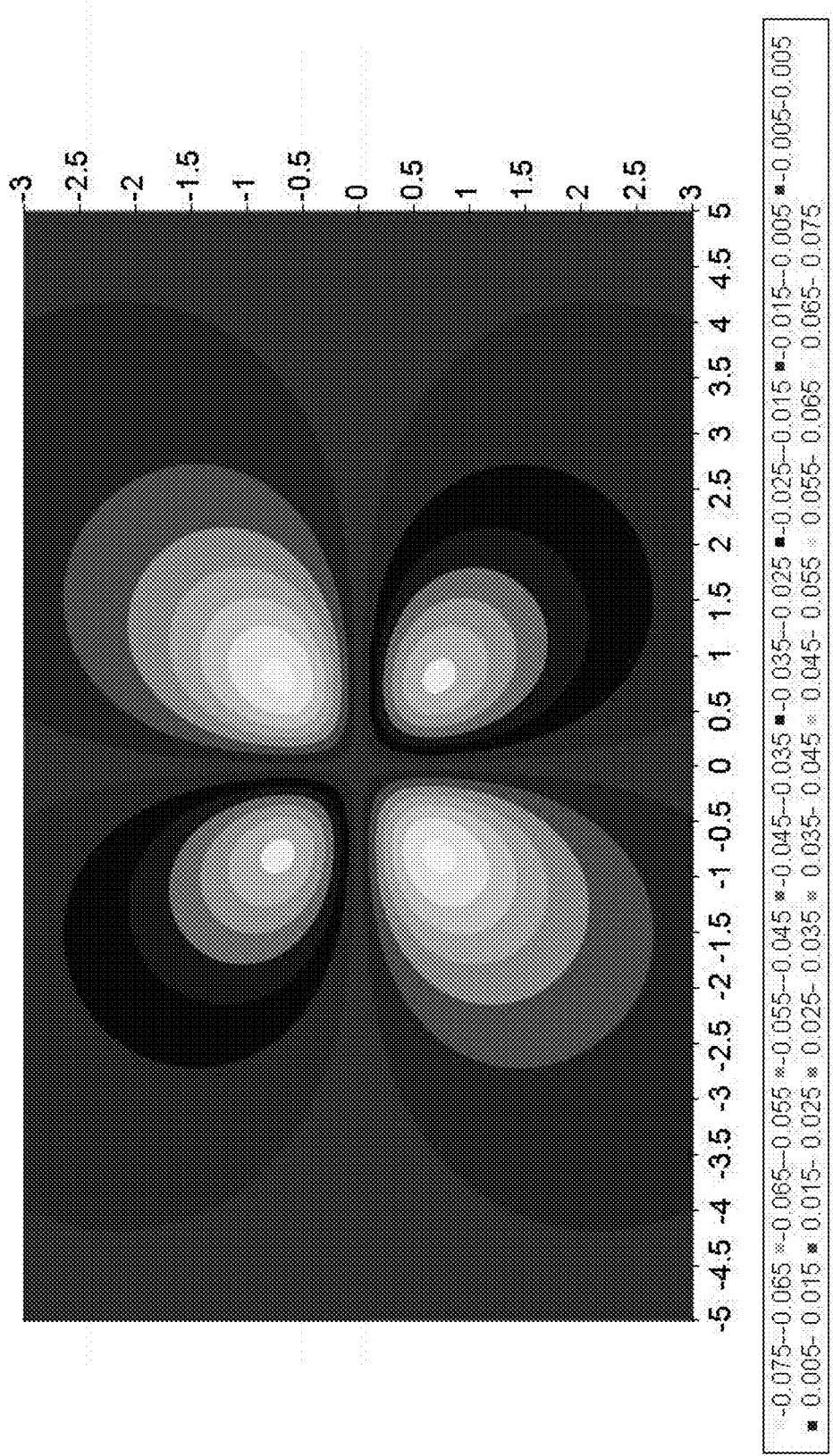
Figure 3C:
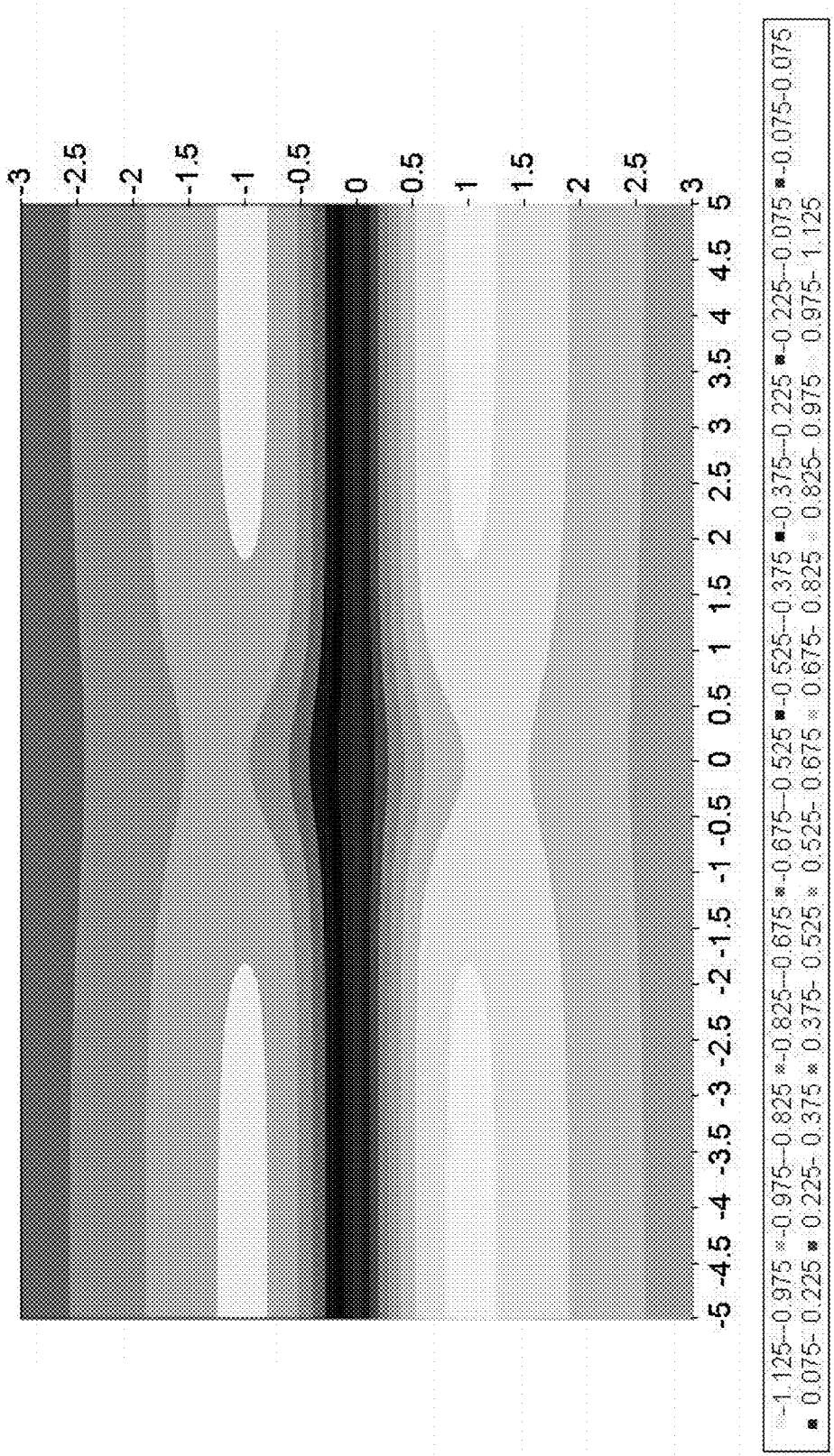

FIGS. 3A-3C show the magnetic field distribution in the case of measuring the portion where a buried pipe is an under-crossing state by using detection device 1 of the buried metal.

Figure 4A:
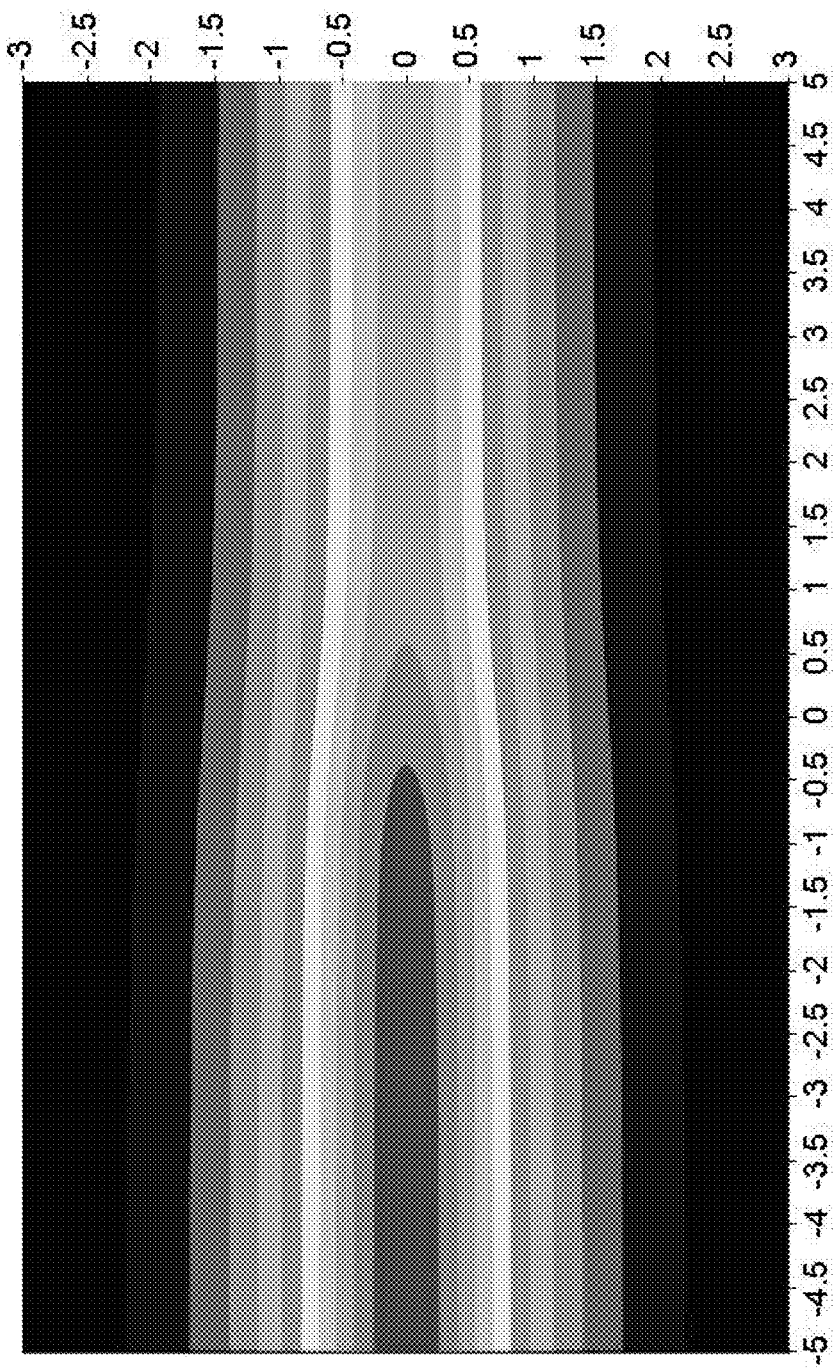
Figure 4C:
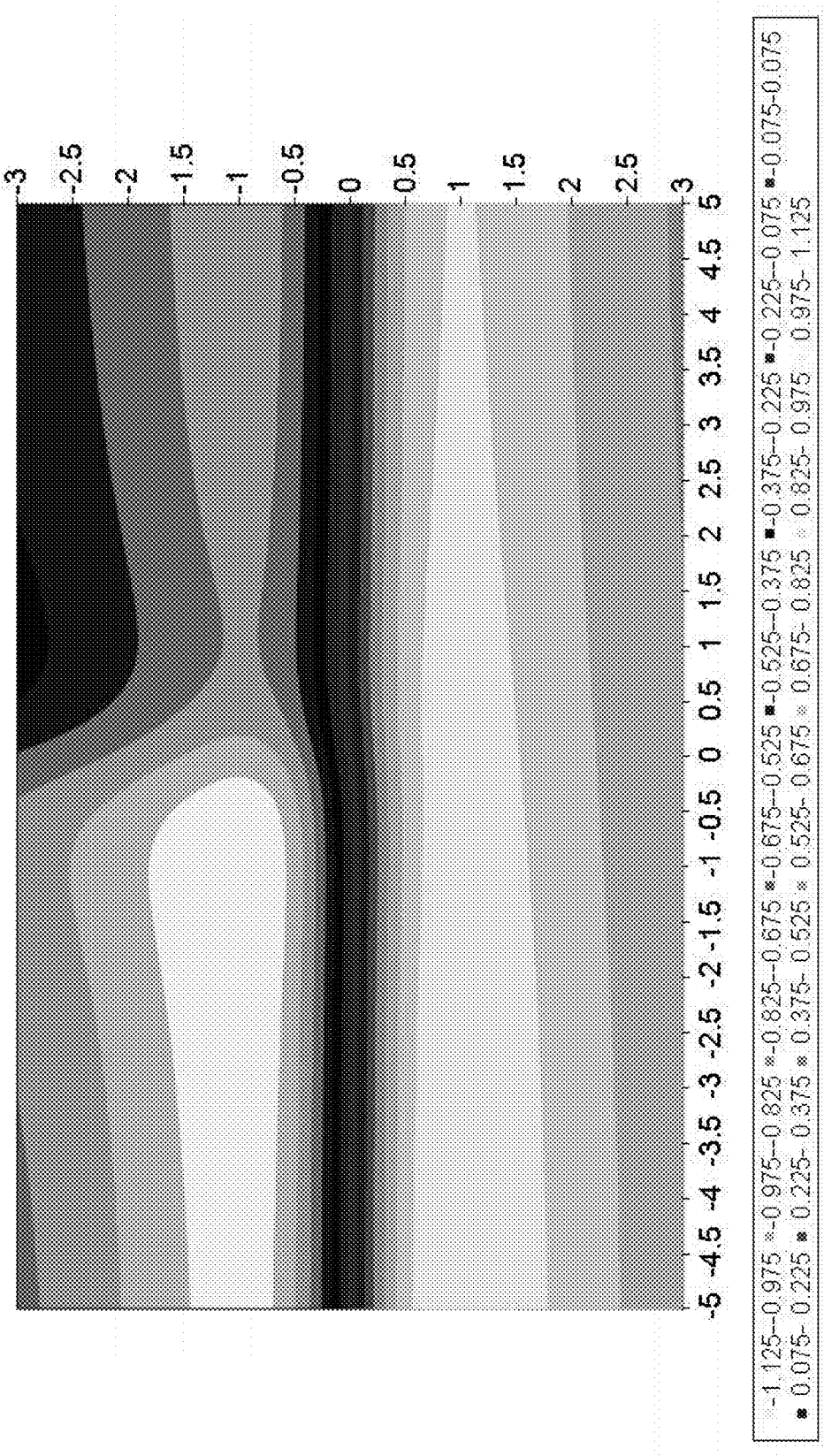

FIGS. 4A-4C show the magnetic field distribution in the case of measuring the portion where a buried pipe is a branched state by using detection device 1 of the buried metal.

In these figures, FIGS. 2A, 3A and 4A show magnetic field distribution of the magnetic field component (it is hereafter described as an X-axis component.) of the direction of the X-axis, FIGS. 2B, 3B, and 4C show magnetic field distribution of the magnetic field component (it is hereafter described as a Y-axis component.) of the direction of the Y-axis, and FIGS. 2C, 3C, and 4C show magnetic field distribution of the magnetic field component (it is hereafter described as a Z-axis component.) of the direction of the Z-axis, respectively.

Figure 5A:
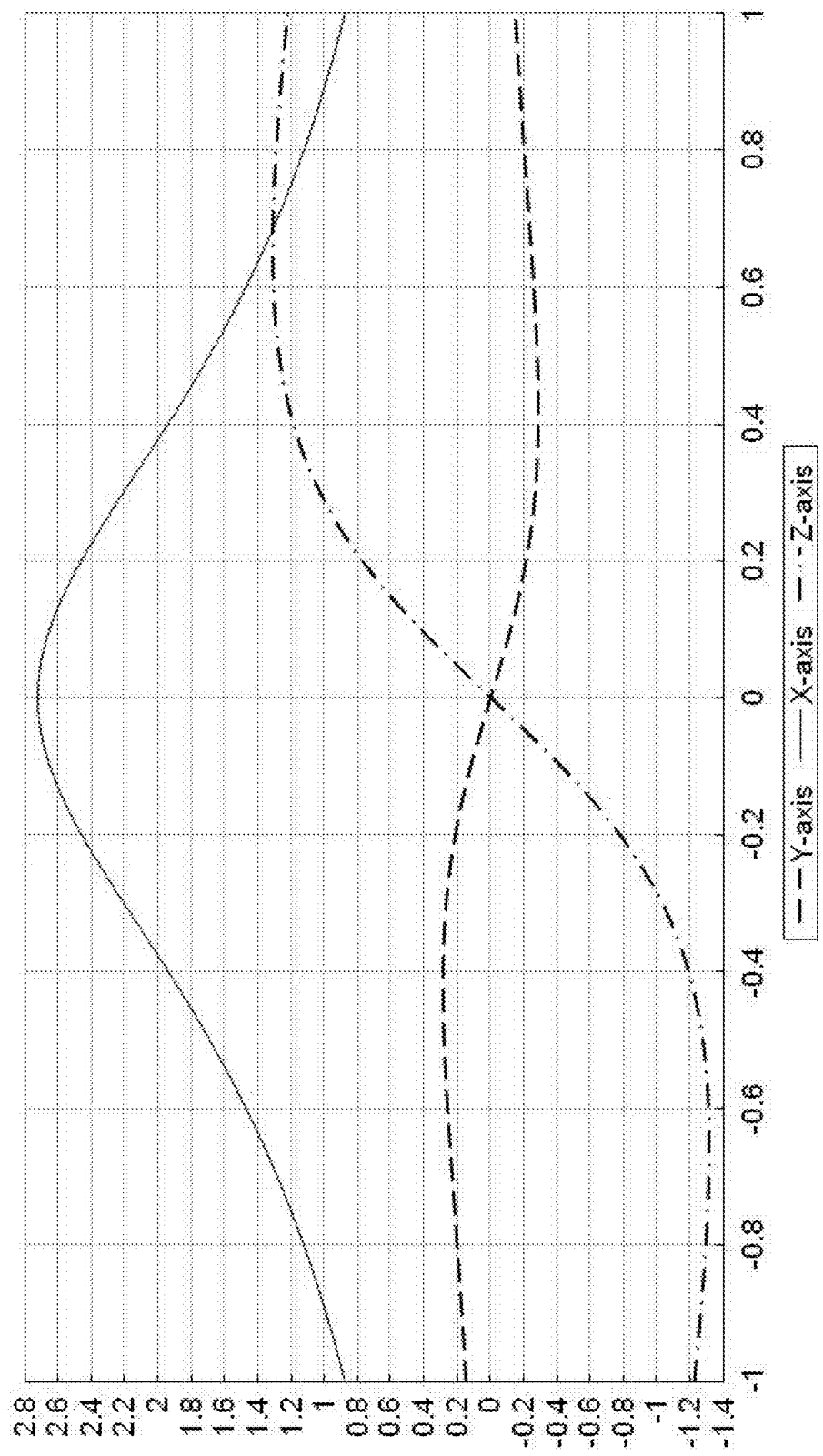
FIGS. 5A-5C show the embodiment of this invention and change of the phase graphed about each phase of the component of X, Y and the Z-axis, respectively.
Figure 5B:
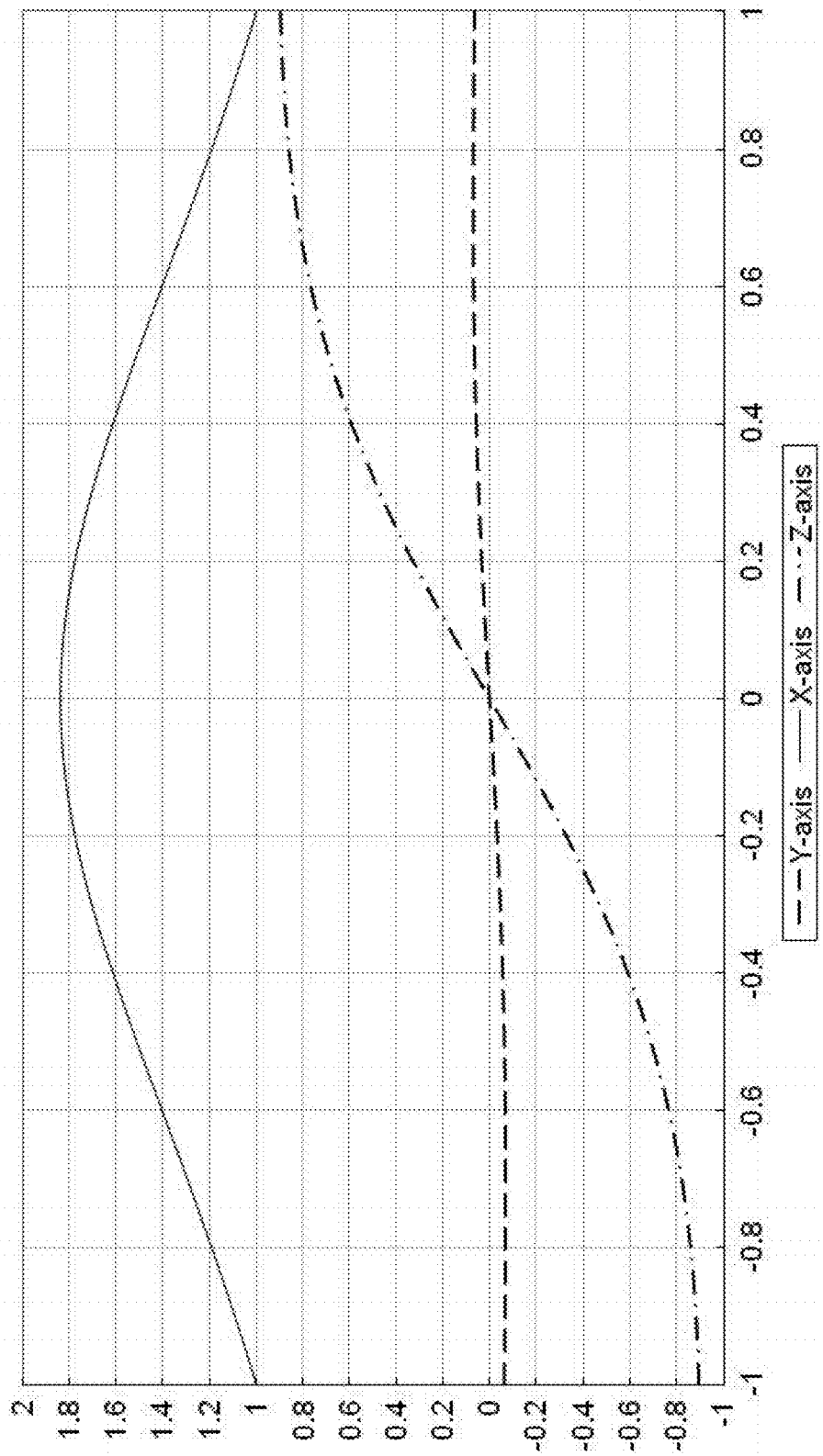
Figure 5C:
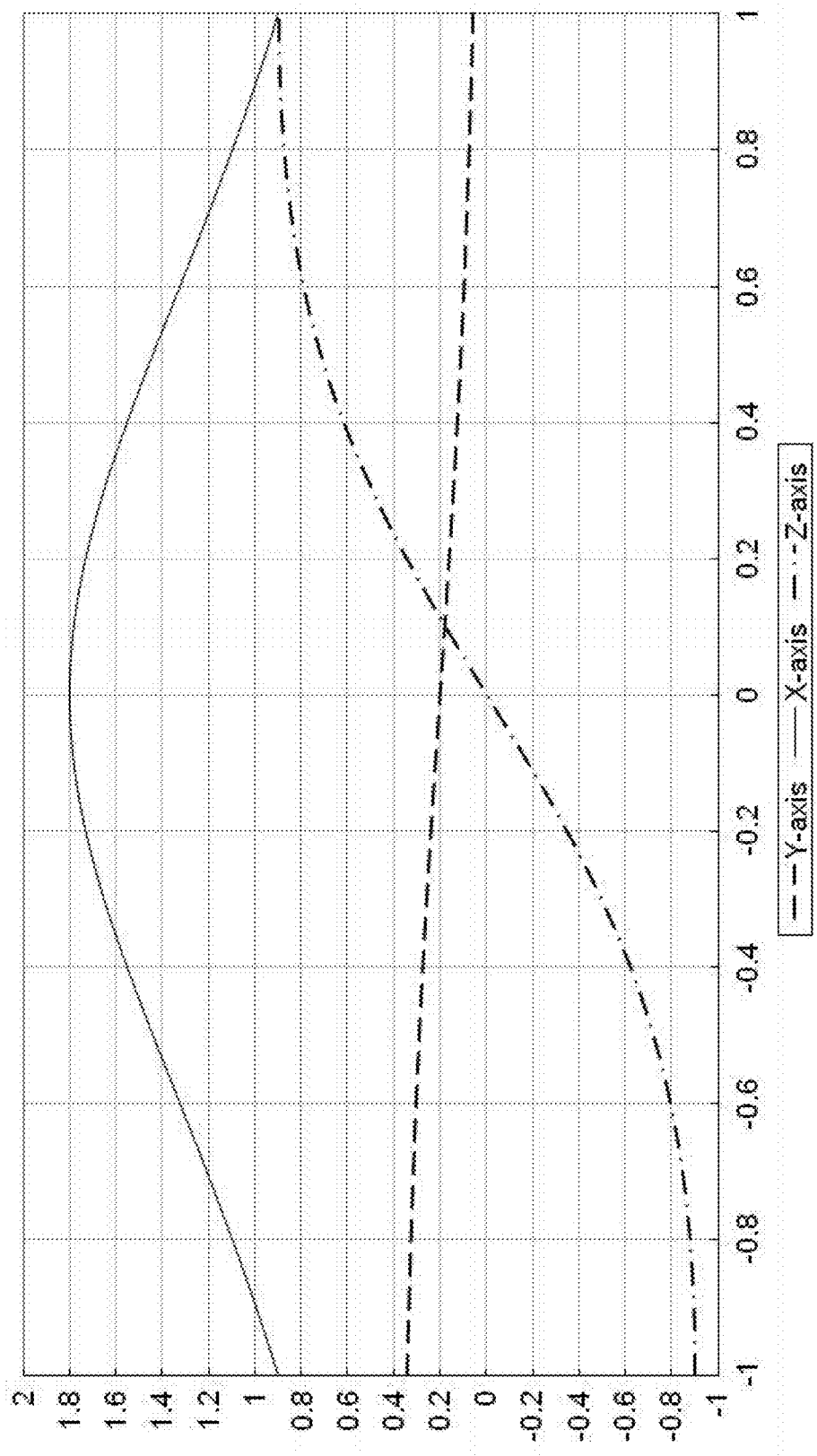
Figure 6:
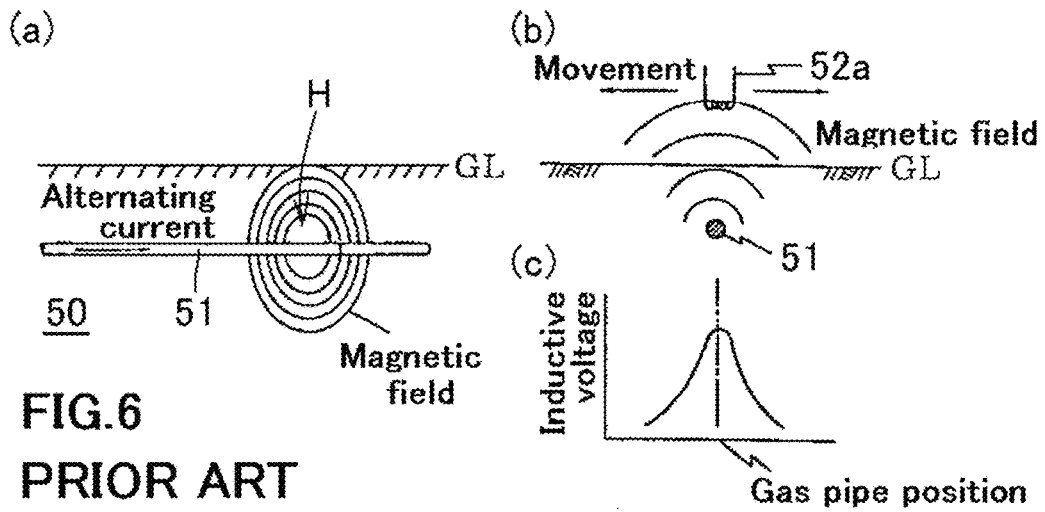
FIG. 6 shows a conventional example and is a mimetic diagram showing the detection principle of an electromagnetic guidance pipeline detector (pipe locator).
Figure 7:
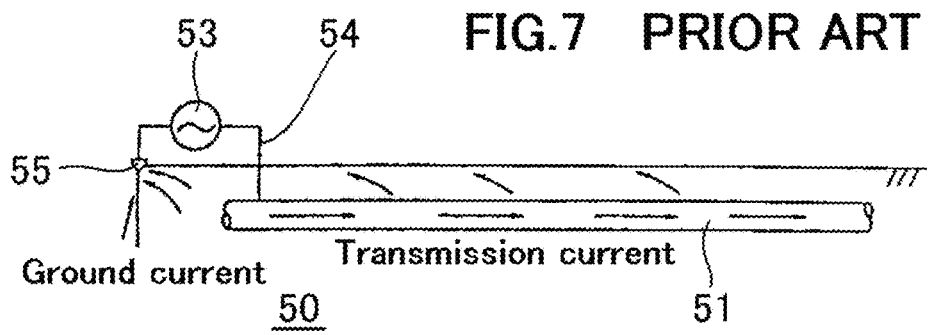
FIG. 7 shows a conventional example and is a mimetic diagram showing the transmission method of the current by the direct method of an electromagnetic guidance pipeline detector (pipe locator).
Figure 8:
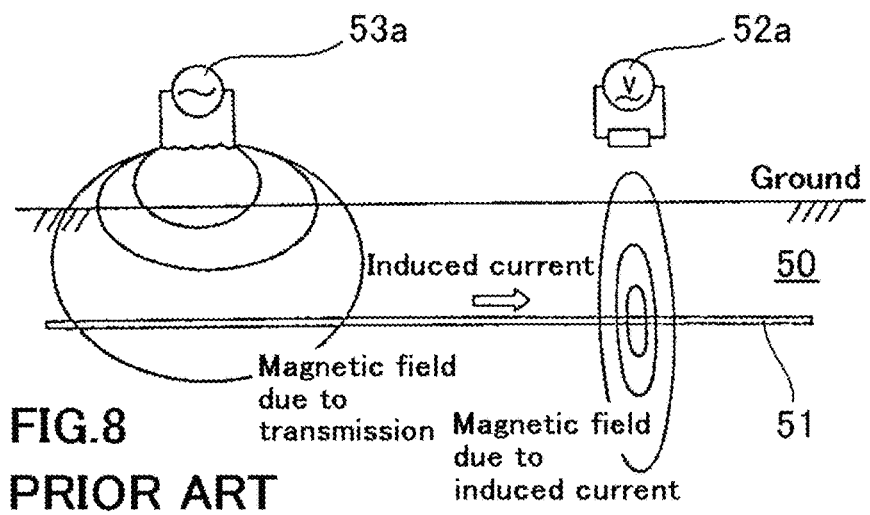
FIG. 8 shows a conventional example and is a mimetic diagram showing the transmission method of the current by the induction method of an electromagnetic guidance pipeline detector (pipe locator).

FIGS. 5A-5C show change of the phase graphed about each phase of the component of X, Y and the Z-axis, respectively, FIG. 5A is an over-crossing state, in the case of Y=0.58, FIG. 5B is an under-crossing state and, in the case of Y=0.8, FIG. 5C is a branched state, in the case of Y=0.

In FIG. 1, detection device 1 of buried metal is constituted by the transmitter and the receiver.

The transmitter sends alternating current through metal buried pipes (it is hereafter described as buried metal.), such as a water pipe, a gas pipe, a drain pipe, a communication cable, and an electric power cable buried in the ground, the receiver detects the magnetic field guided to buried metal by this transmitter, and detects a singular point.

This receiver 2 consists of the magnetic sensor 3 (3a, 3b, 3c, 3d), the I/V converter 4 (4a, 4b, 4c, 4d), the 1st amplifier 5 (5a, 5b, 5c, 5d), the band path filter 6 (6a, 6b, 6c, 6d), the 2nd amplifier 7 (7a, 7b, 7c, 7d), the optical receiver 11, a filter 12, the phase adjustment machine 13, the square wave converter 14, the detector 21 (21a, 21b, 21c, 21d), the low pass filter 22 (22a, 22b, 22c, 22d), DC amplifier 23 (23a, 23b, 23c, 23d), A/D converter 24 (24a, 24b, 24c, 24d), CPU31, display 32, and a switch 33.

Magnetic sensor 3 (3a, 3b, 3c, 3d) is a coil, and is detected the current flowing through the coil as the induced electromotive force generated in this coil.

In order to make detection of a singular point easy by detecting the magnetic field guided to a buried metal in three dimensions, the magnetic sensor 3 comprises magnetic sensor 3a for X-axis component detection, magnetic sensor 3b for Y-axis component detection and magnetic sensor 3c for Z-axis component detection.

In this embodiment, in order to measure the depth of a singular point, magnetic sensors 3d for the 2nd X-axis component detection is installed apart from the coil of magnetic sensor 3a, and the coil of this magnetic sensor 3d is installed in the direction which can detect the magnetic field component of the direction of the X-axis.

In order to measure the depth of a buried metal, it is necessary to measure the amplitude of the X-axis at two points separated constant distance.

The X-axis shows a right-angled direction to a buried metal.

That is, the X-axis shows a right-angled direction to the current which flows into a buried metal, and a parallel direction is shown to surface of the ground.

The Y-axis shows a parallel direction to a buried metal.

That is, the Y-axis shows the direction of current through which it flows into buried metal, and a direction parallel to surface of the earth is shown, and the Z-axis shows a direction perpendicular to surface of the earth.

In this embodiment, detector 21 is an analog switch.

In order to perform the below-mentioned synchronous detection, the receiving circuit of each axis (the X-axis, Y-axis, Z-axis) from magnetic sensor 3 to A/D converter 24 in receiver 2 is constituted so that the amplitude characteristic, a frequency characteristic, and the phase characteristic may become equal.

Next, operation and movement at the time of searching for a singular point using detecting device 1 of a buried metal is explained in detail.

First, in FIG. 1, an alternating current is sent through buried metal with the transmitted signal from a transmitter.

When a portion of buried metal is exposed to the ground, an alternating current may be sent through a buried metal by direct method.

That is, the output of a transmitter is directly connected to this exposed portion, an alternating current may be sent through a buried metal.

When the buried metal is not exposed to the ground at all, an alternating current may be sent through a buried metal by induction method.

That is, an alternating magnetic field is generated from the transmitter installed on the ground, and an alternating current may be sent through a buried metal in the ground in non-contact manner by electromagnetic induction.

This embodiment explains the case where an alternating current is sent through a buried metal by induction method.

While receiver 2 detects the magnetic field generated by the alternating current which is flowing into the buried metal for every magnetic field component of each axis with magnetic sensor 3 (3a, 3b, 3c, 3d), and synchronous detection is performed by inputting the transmitting signal from the transmitter for sending an alternating current through a buried metal into the detector of a receiver as a reference signal. By this synchronous detection, CPU32 of receiver 2 calculates for the amplitude and the phase of a magnetic field component of each axis generated from the buried metal.

The magnetic field distribution and the depth of buried metal is calculated from the amplitude and the phase of a magnetic field component of each axis, the magnetic field distribution and the depth of buried metal is outputted to display 33.

A singular point is detected based on the magnetic field distribution of the magnetic field component of each axis and the depth of buried metal which were outputted to display 33.

Here, the example of the X-axis component of the magnetic field generated from the buried metal is explained in detail.

An alternating current is sent through buried metal with the transmitted signal from a transmitter.

The magnetic field guided to buried metal by this alternating current induces induced electromotive force in the coil of magnetic sensor 3a installed in the direction of the X-axis.

The current which flows into the coil of magnetic sensor 3a according to this induced electromotive force is converted into voltage with I/V converter 4a.

Next, the output of I/V converter 4a is amplified with the 1st amplifier 5a, and is removed an unnecessary frequency component with band path filter 6a, and is amplified again with the 2nd amplifier 7a.

On the other hand, the transmitted signal from a transmitter is inputted into optical receiver 11 as a reference signal via an optical cable (not shown) in this embodiment.

The reference signal inputted into optical receiver 11 removes a noise component with filter 12, performs phase adjustment with phase adjustment machine 13, and converts it into a rectangular wave with rectangular wave converter 14.

The reason for performing phase adjustment of the reference signal needs to unite the phase of an incoming signal and the reference signal, in order to carry out synchronous detection.

In an induction method and direct method, a phases of the current which flows into buried metal are different 90 degrees, and a phase changes with the impedance of buried metal.

The signal of the X-axis component amplified with the 2nd amplifier 7a is detected by switching the analog switch of detector 21a by the reference signal converted into the rectangular wave with rectangular wave converter 14, and is removed a higher harmonics component of the signal by low pass filter 22a, and is extracted.

After this extracted signal of X-axis component is amplified with DC amplifier 23a, it is converted into a digital signal with A/D converter 24a, and is inputted into CPU31. CPU31 performs signal processing of the signal of X-axis component, and calculates for the amplitude and the phase of X-axis component.

Magnetic field distribution of X-axis component is calculated from the amplitude and the phase of X-axis component, and is outputted to display 32.

About Y-axis component as well as the example of X-axis component, an alternating current is sent through buried metal with the transmitted signal from a transmitter. The magnetic field guided to buried metal by this alternating current induces induced electromotive force in the coil of the magnetic sensor 3b installed in the direction of the Y-axis.

The current which flows into the coil of magnetic sensor 3b according to this induced electromotive force is converted into voltage with I/V converter 4b.

Next, the output of I/V converter 4b is amplified with the 1st amplifier 5b, and is removed an unnecessary frequency component with band path filter 6b, and is amplified again with the 2nd amplifier 7b.

This signal of Y-axis component is detected with detector 21b by the reference signal converted into the rectangular wave with rectangular wave converter 14, and is removed a higher harmonics component of the signal by low pass filter 22b, and is extracted.

After this extracted signal of Y-axis component is amplified with DC amplifier 23b, it is converted into a digital signal with A/D converter 24b, and is inputted into CPU31. CPU31 performs signal processing of the signal of Y-axis component, and calculates for the amplitude and the phase of Y-axis component.

Magnetic field distribution of Y-axis component is calculated from the amplitude and the phase of Y-axis component, and is outputted to display 32.

About Z-axis component as well as the examples of X-axis and Y-axis component, the magnetic field guided to buried metal induces induced electromotive force in the coil of magnetic sensor 3c installed in the direction of the Z-axis.

The current which flows into the coil of magnetic sensor 3c according to this induced electromotive force is converted into voltage with I/V converter 4c.

Next, the output of I/V converter 4c is amplified with the 1st amplifier 5c, and is removed an unnecessary frequency component with band path filter 6c, and is amplified again with the 2nd amplifier 7c.

This signal of Z-axis component is detected with detector 21c by the reference signal converted into the rectangular wave with rectangular wave converter 14, and is removed a higher harmonics component of the signal by low pass filter 22c, and is extracted.

After this extracted signal of Z-axis component is amplified with DC amplifier 23c, it is converted into a digital signal with A/D converter 24c, and is inputted into CPU31. CPU31 performs signal processing of the signal of Z-axis component, and calculates for the amplitude and the phase of Z-axis component.

Magnetic field distribution of Z-axis component is calculated from the amplitude and the phase of Z-axis component, and is outputted to display 32.

The 2nd X-axis component is the same as the above, and the magnetic field guided to buried metal induces induced electromotive force in the coil of magnetic sensors 3d for the 2nd X-axis component detection.

This coil of magnetic sensor 3d is installed apart from the coil of magnetic sensor 3a, and is installed in the direction which can detect the magnetic field of the direction of the X-axis.

The current which flows into the coil of magnetic sensors 3d according to this induced electromotive force is converted into voltage with I/V converter 4d.

Next, the output of I/V converter 4d is amplified with the 1st amplifier 5d, and is removed an unnecessary frequency component with band path filter 6d, and is amplified again with the 2nd amplifier 7d.

This signal of the 2nd X-axis component is detected with detector 21d by the reference signal converted into the rectangular wave, and is removed a higher harmonics component of the signal by low pass filter 22d, and is extracted.

After this extracted signal of the 2nd X-axis component is amplified with DC amplifier 23d, it is converted into a digital signal with A/D converter 24d, and is inputted into CPU31.

CPU31 performs signal processing of the signal of the 2nd X-axis component and X-axis component, and calculates for the depth of singular point, and outputs it to display 32.

In this embodiment, the reference signal is transmitted with the optical cable, but is not limited to this.

For example, the reference signal may be transmitted by radio.

In this embodiment, synchronous detection has realized by the switching the analog switch of detector 21 with the reference signal converted into the rectangular wave, but is not limited to this.

For example, detector 21 is used as the analog multiplier instead of an analog switch, and the composition of rectangular wave converter 14 is excluded, and synchronous detection may be realized by integrating by the multiplier of detector 21 the reference signal of a sine wave.

In this embodiment, since it is necessary to measure the amplitude of the X-axis about two separated points in order to measure depth, although the system from magnetic sensor 3 of receiver 2 to A/D conversion machine 24 is considering it as four lines (two lines for the direction of the X-axis, one line for the direction of the Y-axis, and one line for the direction of the Z-axis), it is not limited to this.

The direction of the X-axis, the direction of the Y-axis, and the direction of the Z-axis may constitute in three lines as every one line, respectively.

Next, the inventor experimented using detecting device 1 of the buried metal by this invention for detecting a singular point.

As form of an buried pipe, it experimented about the three cases as follows.

(1) over-crossing states, (2) under-crossing states, (3) branched states,

First, the form of the buried metal used for the experiment is explained.

The shape of buried metal is the buried pipe formed into the shape of a straight line long enough, and is buried under the depth of 1 [m] from surface of the earth.

In this embodiment, this buried pipe is made into an example and indicated.

(1) Over-Crossing State;

The central part of a buried pipe is formed into the shape of a singular point (an over-crossing state).

The portion of the over-crossing state which is a singular point has 0.5 [m] stood up from the buried pipe, and it is formed so that the depth may be set to 0.5 [m] and length may be set to 1 [m].

The length of portions other than the singular point of an buried pipe was considered as each right and left 1,000,000 [m].

The reason for having made the length of portions other than a singular point into the above-mentioned value is for considering it as infinite length calculatively.

(2) A under-crossing state and (3) branched states are also the same.

(2) Under-Crossing State;

The central part of a buried pipe is formed into the shape of a singular point (under-crossing state) like the case of the above-mentioned (1) over-crossing state.

The portion of the under-crossing state which is a singular point has 0.5 [m] dropped from the buried pipe, and it is formed so that the depth may be set to 1.5 [m] and length may be set to 1 [m].

The length of portions other than the singular point of an buried pipe was considered as each right and left 1,000,000 [m].

(3) Branched State;

The central part of a buried pipe is formed into the shape of a singular point (branched state) like the case of the above-mentioned (1) over-crossing state and (2) under-crossing states.

The portion of the branched state which is a singular point has branched in the same depth as an buried pipe, and it is formed so that length may be set to 10 [m].

The length of portions other than the singular point of an buried pipe was considered as each right and left 1,000 [m].

Next, an experimental result is explained using FIGS. 2A-2C, 3A-3C, 4A-4C, and 5A-5C.

About the buried pipe which has a singular point of above-mentioned (1)-(3), the inventor experimented using the detecting device of the buried metal by this invention, and detected the singular point.

FIGS. 2A-2C, 3A-3C, and 4A-4C show an experimental result, and show magnetic field distribution of the magnetic field component of each axis (X, Y, Z).

FIGS. 5A-5C are graph of the change in each phase of the magnetic field component of each axis, respectively, FIG. 5A shows over-crossing state, FIG. 5B shows under-crossing state, and FIG. 5C shows branched state.

(1) Over-Crossing State;

In FIGS. 2A-2C, a vertical axis and a horizontal axis show the distance from the center of an buried pipe, i.e., the center of the portion of the over-crossing state which is a singular point, the vertical axis is the direction of the X-axis [m], and the horizontal axis is the direction of the Y-axis [m].

FIGS. 2A-2C show magnetic field distribution and, FIG. 2A is the X-axis component, FIG. 2B is the Y-axis component and FIG. 2C is the Z-axis components, respectively.

In FIGS. 2A-2C, the position of the center of the portion of the over-crossing state which is a singular point can be distinguished to some extent.

Especially the magnetic field pattern in magnetic field distribution of the Y-axis component of FIG. 2B is very characteristic, and the position of the center of a singular point is displayed clearly,
the position of coordinates where a Y-axis component serves as a peak is set to X=±0.42 and Y=±0.58.

When the level of a peak is compared with the X-axis just above an buried pipe, in an over-crossing state, it becomes about 0.14, and is about 0.035 in the under-crossing state mentioned later.

As shown in FIG. 2A, the length of the strong portion of a magnetic field is about ±0.5 [m] (namely, about 1 [m]) from the center, and can presume about the length of the portion which is an over-crossing state from this.

(2) Under-Crossing State;

In FIGS. 3A-3C, almost like the case of an over-crossing state, the vertical axis and the horizontal axis show the distance from the center of an buried pipe, i.e., the center of the portion of the under-crossing state which is a singular point, the vertical axis is the direction of the X-axis [m], and the horizontal axis is the direction of the Y-axis [m].

FIGS. 3A-3C show magnetic field distribution, and FIG. 3A is an X-axis component, FIG. 3B is a Y-axis component and FIG. 3C is a Z-axis components, respectively.

In FIG. 3A-3C, the position of the center of the portion of the under-crossing state which is a singular point can be distinguished to some extent.

Especially the magnetic field pattern of magnetic field distribution of the Y-axis component of FIG. 2B is very characteristic, and the position of the center of a singular point is displayed clearly,
the position of coordinates where a Y-axis component serves as a peak is set to X=±0.71 and Y=±0.80.

As shown in FIG. 3A, the length of the portion to which the magnetic field is weak is about ±0.5 [m] (namely, about 1 [m]) from the center, and outline presumption is possible for the length of the portion which is a under-crossing state from this.

Here, when the result of (1) over-crossing state shown in FIGS. 2A-2C and (2) under-crossing states shown in FIGS. 3A-3C is compared, there is an interesting point.

If magnetic field distribution of (a) X-axis component of each figure (FIGS. 2A and 3A) is compared, in the case of the over-crossing state, the magnetic field around a singular point is strong, and, in the case of the under-crossing state, the magnetic field around a reverse singular point is weak.

It can be distinguished to some extent from such a phenomenon whether a singular point is an over-crossing state or it is a under-crossing state by magnetic field distribution of an X-axis component.

An interesting point is magnetic field distribution of the Y-axis component.

If magnetic field distribution of (b) Y-axis component of each figure (2 figures and 3 figures) is compared, the pattern of the magnetic field in magnetic field distribution is very alike, but it is a point used as a reverse phase in an over-crossing state and a under-crossing state.

Therefore, in magnetic field distribution of the Y-axis component, by investigating the phase of the Y-axis on the basis of the X-axis, a singular point can be distinguished whether it is an over-crossing state or it is a under-crossing state.

(3) Branched State;

As shown in FIGS. 4A-4C, almost like the case of an over-crossing state and a under-crossing state, the vertical axis and the horizontal axis show the distance from the center of an buried pipe, i.e., the center of the branched state which is a singular point, the vertical axis is the direction of the X-axis [m], and the horizontal axis is the direction of the Y-axis [m].

FIGS. 4A-4C show magnetic field distribution, and FIG. 4A is a X-axis component, FIG. 4B is a Y-axis component, and FIG. 4C is a Z-axis components.

FIGS. 4A-4C, the position of the center of a branched state and the direction of the buried pipe of a branched state which is a singular point can be distinguished to some extent.

Especially the magnetic field pattern in magnetic field distribution of the Y-axis component of FIG. 4B is very characteristic, and direction of the position of the center of a singular point and the direction of the buried pipe of a branched state is displayed clearly.

In FIG. 5C, the Y-axis component of a magnetic field does not change by right and left of the buried pipe.

INDUSTRIAL APPLICABILITY

This invention can detect buried metal, such as metal pipes, such as a water pipe, a gas pipe, and a drain pipe currently buried in the ground, or a telecommunication cable, and an electric power cable.

This invention is broadly applicable also to detection of the steel rod, a steel frame, etc. of a building, and detection of the bomb currently buried in the ground for years.

DESCRIPTION OF NOTATIONS

1 Detection Device of Burial Metal
2 Receiver
3 (3a, 3b, 3c, 3d) Magnetic sensor
21 (21a, 21b, 21c, 21d) Detector
31 CPU
32 Indicator

The invention claimed is:

1. A detecting method of buried metal which detects said buried metal by sending an alternating current through buried metal from a transmitter, and detecting the magnetic field generated by the alternating current which flows into said buried metal with the magnetic sensor of a receiver, the detection method of buried metal comprising:
said receiver consists of two or more magnetic sensors installed in the direction to detectable the magnetic field component of the direction of XYZ axes, respectively,
a detector which detects the magnetic field component of said direction of XYZ axes detected with this magnetic sensor, respectively,
a CPU which has the function to perform signal processing each amplitude and each phase of the magnetic field component of said direction of the XYZ axes,
a display which displays the result which carried out signal processing by this CPU,
said detector calculates for each phase of the magnetic field component of the direction of the XYZ axes, from said magnetic field by synchronous detection using the transmitted signal of the transmitter for sending an alternating current through said buried metal as a reference signal, said CPU creates image data which expresses magnetic field distribution of an XYZ axis component, about a magnetic field component of an XYZ axis, respectively by carrying out image processing of each amplitude and each phase of a magnetic field component of said direction of XYZ axes, the image data is outputted to said display, while calculating for the position of a singular point from each amplitude of the image data, and this singular point is determined whether it is an over-crossing state or it is an under-crossing state from the phase of the image data of an X-axis component and the phase of the image data of a Y-axis component in this singular point, and it is determined from at least one image data of the XYZ axis component in said singular point whether it is an branched state.

2. The detecting method of buried metal of claim 1, wherein said receiver is installed apart from a magnetic sensor installed in the direction which can detect a magnetic field component of the direction of the X-axis, and it has the 2nd magnetic sensor installed in the direction which can detect the magnetic field component of the direction of the X-axis, said detector detects the 2nd magnetic field component of the direction of the X-axis detected with said 2nd magnetic sensor, said CPU calculates for the amplitude and the phase of the 2nd magnetic field component of the direction of the X-axis, respectively, it calculates for the depth of said singular point from the amplitude and the phase of the 2nd magnetic field component of the direction of the X-axis, and the amplitude and the phase of the magnetic field component of the direction of the X-axis, said display displays the depth of said singular point.

3. A detection device of buried metal which detects said buried metal by sending an alternating current through the buried metal from a transmitter, and detecting the magnetic field generated by the alternating current which flows into said buried metal with the magnetic sensor of a receiver, the detection device of buried metal comprising:

said receiver consists of two or more magnetic sensors installed in the direction to detectable the magnetic field component of the direction of XYZ axes, respectively, a detector which detects the magnetic field component of said direction of XYZ axes detected with said magnetic sensor, respectively, a CPU which has the function to perform signal processing of each amplitude and each phase of a magnetic field component of said direction of the XYZ axes, an display which shows the result which carried out signal processing by this CPU, said detector has the function to calculate for each phase of the magnetic field component of the direction of the XYZ axis, from said magnetic field, respectively, by synchronous detection using the transmitting signal of the transmitter for sending an alternating current through said buried metal as a reference signal, and said CPU has the function which creates image data which expresses magnetic field distribution of an XYZ axis component, about a magnetic field component of an XYZ axis, respectively by carrying out image processing of each amplitude and each phase of a magnetic field component of said direction of the XYZ axes, the function which outputs the image data to said display, the function which calculating for the position of a singular point from each amplitude of the image data, and the function which this singular point is determined whether it is an over-crossing state or it is an under-crossing state from the phase of the image data of an X-axis component and the phase of the image data of a Y-axis component in this singular point, and the function which it is determined from at least one image data of the XYZ axis component in said singular point whether it is an branched state.

4. The detection device of buried metal of claim 3, said receiver is installed apart from the magnetic sensor installed in the direction which can detect the magnetic field component of the direction of the X-axis, and it has the 2nd magnetic sensor installed in the direction which can detect the magnetic field component of the direction of the X-axis, said detector has the function to detect the 2nd magnetic field component of the direction of the X-axis detected with said 2nd magnetic sensor, said CPU has the function to calculates for the amplitude and the phase of the 2nd magnetic field component of the direction of the X-axis, respectively, and the function to calculate for the depth of said singular point from the amplitude and the phase of the 2nd magnetic field component of the direction of the X-axis, and the amplitude and the phase of the magnetic field component of the direction of the X-axis, said display has a function which displays the depth of said singular point.

* * * * *